Patented Apr. 19, 1932

1,854,562

UNITED STATES PATENT OFFICE

WERNER SCHULEMANN, OF VOHWINKEL, AND FRITZ SCHÖNHÖFER, OF ELBERFELD, GERMANY, ASSIGNORS TO WINTHROP CHEMICAL COMPANY, INC., OF NEW YORK, N. Y., A CORPORATION OF NEW YORK

CINCHONA ALKALOID PREPARATION

No Drawing. Application filed November 25, 1929, Serial No. 409,749, and in Germany November 29, 1928.

The present invention relates to new cinchona alkaloid preparations.

The neutral salts of alkaloids of cinchona bark and the hydrogenation products thereof, such as quinidine, cynchonine and, in particular, quinine and dihydroquinine, often possess the drawback that they are so sparingly soluble in water, that only very dilute aqueous solutions can be produced which, however, are unsuitable for injection. The more readily soluble acid salts, however, exert in aqueous solution, owing to their high hydrogen ion concentration, a very favorable destructive action on tissues. In order to overcome this drawback, attempts have heretofore been made to prepare more readily water-soluble double compounds of the cinchona alkaloids, such as, for instance, quinine urethane, quinine urea or to dissolve quinine hydrochloride in water in the presence of 1-phenyl-2.3-dimethyl-5-pyrazolone. All these processes, however, still possess great disadvantages, as is evident, for example, from "Therapie der Gegenwart" 1927, part 3, page 2 and from "Medizinische Klinik" 1928, page 1594 with regard to quinine urethane and quinine urea. Up to the present time suitable neutral solutions have been obtained only from the combination of quinine with 1-phenyl-2.3-dimethyl-5-pyrazolone. The application of the latter (which, in some respect, is pharmacologically active but inactive against malaria or pneumonia) involves, however, the danger that the undesirable secondary effects of quinine are increased by the pharmacological action or the secondary effects of 1-phenyl-2.3-dimethyl-5-pyrazolone.

In accordance with the present invention, by the application of sarcosin anhydride or homologues thereof, which in contradistinction to 1-phenyl-2.3-dimethyl-5-pyrazolone are pharmacologically indifferent and practically non-poisonous compounds, cinchona alkaloid preparations particularly of quinine and dihydroquinine are obtainable, which yield non-irritant aqueous solutions of a strength up to 40%. These solutions display only the pure therapeutic action of the respective cinchona alkaloids, in particular of quinine and dihydroquinine; the solutions are neutral or weakly alkaline.

The process of manufacture of the present invention consists accordingly in preparing a double compound of a neutral salt of cinchona alkaloid with sarcosin anhydride or a homologue thereof, or mixtures of these components, or in dissolving a neutral salt of a cinchona alkaloid and sarcosin anhydride or a homologue thereof, either in simple admixture or in the form of a double compound, in water.

The process can be carried out, for example, by dissolving in water a double compound obtainable e. g. by heating sarcosin anhydride and a neutral salt of a cinchona alkaloid in benzene solution or by suspending a neutral salt of the cinchona alkaloid in the necessary quantity of water and then adding sarcosin anhydride, or by dissolving the sarcosin anhydride in water and introducing the neutral salt of the cinchona alkaloid into the sarcosin anhydride solution, or by simply mixing sarcosin anhydride with the neutral alkaloid salt and then dissolving this mixture in water. The hydrochloride and the hydrobromide of quinine or dihydroquinine are particularly suitable for the purpose in question, but also other salts of cinchona alkaloids, for instance the acetic acid or lactic acid salts are suitable.

Instead of sarcosin anhydride there can also be used water-soluble homologues thereof, or generally speaking, all the water-soluble compounds which are represented by the probable general formula:—

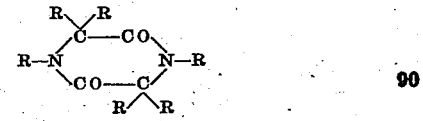

wherein R signifies hydrogen or alkyl. These compounds generally are obtainable by heating amino-acetic acid or substituted amino-acetic acids with or without the addition of a suitable solvent, such as water, glycerine or the like.

This formula also includes the lower homologues of sarcosin anhydride, such as the so-called diketo piperazine and its alkyl derivatives, which will also be operable when being soluble in water and from which the compound of the formula:—

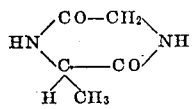

may be mentioned by way of example.

The quantity of these compounds to be applied, varies within wide limits. The double compounds of sarcosin anhydride with quinine hydrochloride or hydrobromide, for example, contain 2 or 3 mols. of the former to one mol. of the latter, but also other proportions between the components are operable. Generally, we prefer to use mixtures containing between about 2 parts by weight of sarcosin anhydride, etc. to one part by weight of the alkaloid salt. It may be mentioned that these solutions are capable to dissolve considerable amounts of the cinchona alkaloids themselves, and, therefore, also aqueous solutions containing the free alkaloids besides the components specified above, are intended to be included in the invention. Besides the aqueous solutions also the solid double compounds or the solid mixtures themselves are of great value for medical purposes. They may, for instance, be pressed into tablets, thus being easy to handle and to dispatch.

The invention is illustrated by the following examples, without being restricted thereto:—

Example 1

5 grams of quinine hydrochloride are mixed with 7 grams of sarcosin anhydride and made up to 20 ccs. by the addition of water, while stirring. After a short time, the suspension changes to a clear, almost colorless solution.

Example 2

324 grams of quinine (anhydrous) are stirred with 200 ccs. of water and 113 ccs. of hydrobromic acid of specific gravity 1.49, while cooling. After the addition of 560 grams of sarcosin anhydride, the mixture is made up with water to 1100 ccs. thereby yielding a clear, almost colorless solution.

Example 3

326 grams of dihydroquinine are stirred with 200 ccs. of water and 113 ccs. of hydrobromic acid of specific gravity 1.49, while cooling. After the addition of 560 grams of sarcosin anhydride, the mixture is made up with water to 1100 ccs. thus yielding a clear, almost colorless solution.

Example 4

7 grams of sarcosin anhydride are dissolved in 5 grams of water, 5 grams of quinine hydrochloride are added, while stirring; a clear, almost colorless solution is obtained.

Example 5

5 grams of quinine hydrochloride are mixed with 7 grams of 1.4-diethyl-2.5-diketo piperazine (melting point 126°)

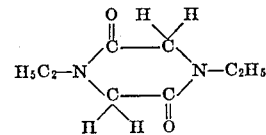

and made up to 20 ccs. with water, while stirring. After a short time, the suspension changes to a clear, almost colorless solution.

Example 6

5 grams of quinine hydrochloride are dissolved in water together with 7 grams of dimethyl-sarcosin-anhydride of the probable formula:

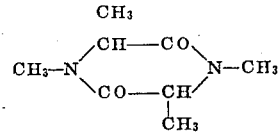

and made up to 20 ccs. The clear, colorless solution remains perfectly clear when diluted with water.

Example 7

5 grams of quinine hydrochloride are dissolved in water together with 7 grams of the substance of the probable formula:

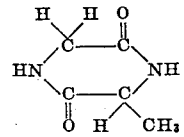

(Ber. 36, page 2113) and made up to 20 ccs. A clear, colorless solution is obtained.

Example 8

3.6 grams (1 mol.) of quinine hydrochloride free from water and 4.2 grams (3 mols.) of sarcosin anhydride are heated in 10 ccs. of benzene on the water bath until a clear solution is obtained. After evaporation, a double compound containing 3 mols. of sarcosin anhydride to one mol. of quinine hydrochloride is obtained in the form of colorless crystals. It is easily soluble in water and the solutions are suitable for injection purposes, as it is the case with the aqueous solutions obtained according to the foregoing examples.

In this example the sarcosin anhydride can be replaced by a homologue thereof, and quinine hydrochloride by another neutral quinine salt or another neutral cinchona alkaloid salt. Also mixtures of the double compounds with a free cinchona alkaloid pressed into tablets, will be valuable for medical purposes yielding, if not too much of the free alkaloid is present, with water clear solutions suitable for injection purposes.

We claim:—

1. Cinchona alkaloid preparations, comprising a neutral salt of a cinchona alkaloid and a water-soluble compound of the probable formula

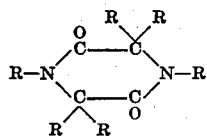

wherein the R's means hydrogen or alkyl.

2. Cinchona alkaloid preparations, comprising water, a neutral salt of a cinchona alkaloid and a water-soluble compound of the probable formula

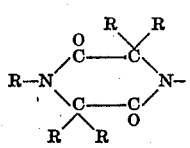

wherein the R's means hydrogen or alkyl, said preparations being neutral or weakly alkaline solutions, suitable for injection purposes.

3. Cinchona alkaloid preparations, comprising a neutral salt of a compound of the group consisting of quinine and dihydroquinine and a water-soluble compound of the probable formula

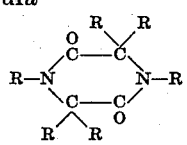

wherein the R's mean hydrogen or alkyl.

4. Cinchona alkaloid preparations, comprising water, a neutral salt of a compound of the group consisting of quinine and dihydroquinine and a water-soluble compound of the probable formula

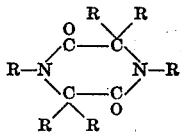

wherein the R's mean hydrogen or alkyl, said preparations being neutral or weakly alkaline solutions, suitable for injection purposes.

5. Cinchona alkaloid preparations, comprising a compound of the group consisting of quinine—and dihydroquinine hydrochloride and—hydrobromide, and sarcosin anhydride.

6. Cinchona alkaloid preparations, comprising water, a compound of the group consisting of quinine—and dihydroquinine hydrochloride and—hydrobromide, and sarcosin anhydride, said preparations being neutral or weakly alkaline solutions suitable for injection purposes.

7. Cinchona alkaloid preparations, comprising a compound of the group consisting of quinine—and dihydroquinine hydrochloride and—hydrobromide, and a water-soluble compound of the probable formula

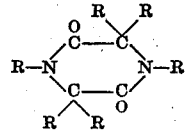

wherein the R's mean hydrogen or alkyl, in an amount corresponding to about 0.5–2 parts by weight to one part by weight of the alkaloid salt.

8. Cinchona alkaloid preparations, comprising water, a compound of the group consisting of quinine—and dihydroquinine hydrochloride and—hydrobromide, and a water-soluble compound of the probable formula

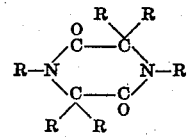

wherein the R's mean hydrogen or alkyl, in an amount corresponding to about 0.5–2 parts by weight to one part by weight of the alkaloid salt, said preparations being neutral or weakly alkaline solutions, suitable for injection purposes.

9. Cinchona alkaloid preparations, comprising a compound of the group consisting of quinine—and dihydroquine hydrochloride and—hydrobromide, and sarcosin anhydride in an amount corresponding to about 0.5–2 parts by weight to one part by weight of the alkaloid salt.

10. Cinchona alkaloid preparations, comprising water and a compound of the group consisting of quinine—and dihydroquinine hydrochloride and—hydrobromide, and sarcosin anhydride in an amount corresponding to about 0.5–2 parts by weight to one part by weight of the alkaloid salt, said preparations being neutral or weakly alkaline solutions, suitable for injection purposes.

11. The cinchona alkaloid preparation containing in 100 ccs. of an aqueous solution about 25 grams of quinine hydrochloride and about 35 grams of sarcosin anhydride, said preparation being a clear, almost colorless solution of nearly neutral reaction, suitable for injection purposes.

In testimony whereof, we affix our signatures.

WERNER SCHULEMANN.
FRITZ SCHÖNHÖFER.